(12) United States Patent
Rosenbauer et al.

(10) Patent No.: US 6,623,565 B2
(45) Date of Patent: Sep. 23, 2003

(54) METHOD FOR OPERATING A HOUSEHOLD DISHWASHER AND HOUSEHOLD DISHWASHER FOR CARRYING OUT THE METHOD

(75) Inventors: Michael Rosenbauer, Reimlingen (DE); Bruno Reiter, Neresheim-Kösingen (DE); Reinhard Hering, Holzheim (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 09/803,763

(22) Filed: Mar. 12, 2001

(65) Prior Publication Data

US 2001/0017145 A1 Aug. 30, 2001

Related U.S. Application Data

(63) Continuation of application No. PCT/EP99/06595, filed on Sep. 7, 1999.

(30) Foreign Application Priority Data

Sep. 11, 1998 (DE) .......................................... 198 41 694

(51) Int. Cl.$^7$ ................................................ B08B 7/04
(52) U.S. Cl. ........................ 134/18; 134/25.2; 134/57 D
(58) Field of Search ........................... 134/10, 18, 25.2, 134/56 D, 57 D, 58 D

(56) References Cited

U.S. PATENT DOCUMENTS 5,330,580 A    7/1994  Whipple, III et al. ........ 139/18
5,797,409 A  * 8/1998  Cooper et al. ................ 134/18
6,103,017 A  * 8/2000  Thies et al. .................... 134/10

FOREIGN PATENT DOCUMENTS

EP    0 326 893 A2    8/1989
EP    0 721 761 A2    7/1996

\* cited by examiner

*Primary Examiner*—Randy Gulakowski
*Assistant Examiner*—Saeed Chaudhry
(74) *Attorney, Agent, or Firm*—Laurence A. Greenberg; Werner H. Stemer; Gregory L. Maybeck

(57) ABSTRACT

The invention relates to a method for operating a household dishwasher, said dishwasher comprising a washing compartment, which is filled by a fresh water supply line, said supply line being provided with an inlet valve, a circulating pump that is connected to the washing compartment on the suction side and to at least one spray device on the delivery side; an evacuation pump, which is connected to the washing compartment on the suction side and to a discharge line on the delivery side, and a program control device, which also contains control units for controlling the pumps. The aim of the invention is to provide a simple way of partially replacing the washing liquid without any unnecessary consumption of water or energy. To this end, both pumps are operated in order to partially replace the washing liquid and the quantity of washing liquid to be pumped out and replaced is determined using the speed of the variable-speed circulating pump.

12 Claims, 2 Drawing Sheets

METHOD FOR OPERATING A HOUSEHOLD DISHWASHER AND HOUSEHOLD DISHWASHER FOR CARRYING OUT THE METHOD

CROSS-REFERENCE TO RELATED APPLICATION

This application is a continuation of International Application No. PCT/EP99/06595, filed Sep. 7, 1999, which designated the United States.

BACKGROUND OF THE INVENTION

1. Field of the Invention

The invention lies in the field of household appliances. The invention relates to a method for operating a household dishwasher and a household dishwasher for carrying out the method. The dishwasher includes a washing container filled through a fresh-water feedline provided with an inlet valve, a circulating pump connected on the suction side to the washing container and on the delivery side to at least one spray device, an emptying pump connected on the suction side to the washing container and on the delivery side to an outflow line, and a program control unit having control devices for controlling the pumps.

German Published, Non-Prosecuted Patent Application DE 20 13 716 A1 discloses a method and a household dishwasher. In the dishwasher, the delivery line of the circulating pump has in it a pressure measuring device that, while the circulating pump is in operation, opens the inlet valve and keeps it open as soon and as long as the pressure in the delivery line of the circulating pump falls below an intended pressure. The function serves for cleaning a sieve configuration that proceeds the circulating pump and, in the event of a deposit of dirt, causes a pressure drop in the delivery line of the circulating pump. As a result of the subsequent opening of the inlet valve, fresh water is delivered up to an upper predetermined level and, by operating the emptying pump, is then pumped away again down to a lower predetermined level. Should the pressure in the delivery line of the circulating pump still be lower than the predetermined pressure, the operation is repeated. The sieve configuration is flushed free as a result of the interaction.

German Published, Non-Prosecuted Patent Application DE 26 46 383 A1 discloses a further method and household dishwasher. The dishwasher likewise has in the delivery line of the circulating pump a pressure measuring device that, while the circulating pump is in operation, opens the inlet valve and keeps it open as soon and as long as the pressure in the delivery line of the circulating pump falls below an intended pressure. Thus, it matches the washing liquid quantity to the dirt quantity absorbed, that is to say, when the washing liquid becomes more viscous due to the absorption of dirt, the feed pressure of the circulating pump decreases, thus leading to further filling with liquid, i.e., dilution of the washing liquid. When a maximum level is reached, without the feed pressure of the circulating pump having reached the predetermined pressure, liquid is pumped away down to a minimum level by the emptying pump and the inlet valve is then kept open until the feed pressure of the circulating pump has reached the predetermined pressure.

Prior art methods and household dishwashers also include a prescribed partial exchange of the washing liquid in specific subprogram steps or between subprogram steps. Such a dishwasher can be found, for example, in German Published, Non-Prosecuted Patent Application DE 42 43 868 A1. That dishwasher unnecessary consumes water and energy due to the predetermined maximum and minimum levels because different subprogram steps are operated with different liquid quantities and the partial-exchange liquid quantity cannot be matched to these different liquid quantities.

SUMMARY OF THE INVENTION

It is accordingly an object of the invention to provide a method for operating a household dishwasher and household dishwasher for carrying out the method that overcomes the hereinafore-mentioned disadvantages of the heretofore-known methods and devices of this general type and that provides a possibility for carrying out a partial exchange of the washing liquid in a simple way without unnecessary water and energy consumption.

With the foregoing and other objects in view, there is provided, in accordance with the invention, a method for operating a household dishwasher, including the steps of filling a washing container through a fresh-water feedline having an inlet valve, connecting a variable-speed circulating pump to the washing container on a suction side of the circulating pump and to at least one spray device on a delivery side of the circulating pump, connecting an emptying pump to the washing container on the suction side of the emptying pump and to an outflow line on a delivery side of the emptying pump, providing a program control unit having control devices for controlling the circulating and emptying pumps, operating both of the circulating and emptying pumps during a partial exchange of the washing liquid, and determining a washing liquid quantity to be pumped away and thereafter to be introduced again by a rotational speed of the circulating pump.

A partial exchange of the washing liquid is simply performed without unnecessary water and energy consumption by operating both pumps during a partial exchange of the washing liquid, and by determining the washing liquid quantity to be pumped away and thereafter to be introduced again by the rotational speed of the circulating pump, which has a variable rotational speed.

The method according to the invention is performed by providing a circulating pump with a rotational speed sensor and a variable rotational speed, and opening and/or closing the inlet valve and/or placing the emptying pump into operation or switching it off while the circulating pump is in operation based on the signals from the rotational speed sensor. During a partial exchange of the washing liquid, both pumps are operated. The washing liquid quantity to be pumped away and/or to be introduced is determined by the rotational speed of the circulating pump.

A low rotational speed of the circulating pump causes a high liquid level to prevail, that is to say, a large liquid quantity to accumulate, in the suction space of the washing container, also referred to as the pump bulb or bowl. A high rotational speed of the circulating pump correspondingly causes a low liquid level to prevail, that is to say, a small liquid quantity to accumulate, in the pump bowl. Because that partial quantity of the liquid quantity accumulated in the pump bowl that is to be pumped away and then filled up again during a partial exchange of the washing liquid is extracted and supplied again, in each subprogram step not only the overall liquid quantity can be set by the circulating pump of variable rotational speed and matched to the respective liquid quantity used in the individual subprogram steps, but also the partial-exchange quantity. During the emptying of the partial quantity, the liquid quantity falls. The fall causes the inlet valve to open and the emptying pump to be switched off so that new liquid can flow in until the circulating pump rotates again, that is to say, air is no longer drawn in. The rotational speed sensor signals the condition and the inlet valve is closed again. Thus, a liquid quantity matched to the subprogram step is extracted and supplied again only according to the rotational speed of the circulating pump. In a method for operating a household dishwasher and in a household dishwasher for carrying out the method according to the invention a possibility of carrying out a part exchange of the washing liquid without unnecessary water and energy consumption is afforded in a simple way.

In accordance with a mode of the invention, during a partial exchange of the washing liquid, the emptying pump, based on the signals from the rotational speed sensor, operated in addition to the circulating pump which is itself in operation, is switched off and the inlet valve is opened. And, the inlet valve is closed again based on the signals from the rotational speed sensor. During the emptying of the partial quantity, the liquid quantity falls until the circulating pump no longer rotates, that is to say, until air is also drawn in. The fall causes a variation in the rotational speed of the circulating pump that is signaled by the rotational speed sensor and that leads to the opening of the inlet valve and to the switching off of the emptying pump so that new liquid can flow in until the circulating pump rotates again, that is to say, until air is no longer drawn in. The rotational speed sensor signals the condition and the inlet valve is closed again. Thus, a liquid quantity matched to the subprogram step is extracted and supplied again only according to the rotational speed of the circulating pump. The additional mounting of filling-level sensors is avoided due to the control solely through the rotational speed sensor, thus leading to an appreciable simplification in the outlay involved in construction and control and, consequently, to an advantage in terms of cost.

In accordance with another mode of the invention, the emptying pump is switched off during a partial exchange of the washing liquid while the circulating pump is operating based on signals from a rotational speed sensor, and/or the inlet valve is opened and/or closed based on the signals from the rotational speed sensor.

In accordance with a further mode of the invention, the rotational speed sensor is connected to the circulating pump.

In accordance with an added mode of the invention, the liquid quantity to be pumped away is limited with a filling-level sensor, and the washing liquid quantity present in addition to the liquid quantity limited by the filling-level sensor and to be pumped away is determined by the rotational speed of the circulating pump.

In accordance with an additional mode of the invention, the liquid quantity to be pumped away is limited with a filling-level sensor while determining, by the rotational speed of the circulating pump, the washing liquid quantity present in addition to the liquid quantity limited by the filling-level sensor and to be pumped away.

In accordance with yet another mode of the invention, the limiting step is performed by limiting the liquid quantity to be pumped away with a filling-level sensor during a partial exchange of the washing liquid.

With the objects of the invention in view, there is also provided a household dishwasher including at least one spray device, an outflow line, a fresh-water feedline having an inlet valve, a washing container for holding washing fluid. The washing container is fluidically connected to the fresh-water feedline for filling the washing container. Also provided is a variable speed circulating pump having a rotational speed sensor, a circulating suction side, and a circulating delivery side. The circulating pump is fluidically connected to the washing container at the circulating suction side and fluidically connected to the at least one spray device at the circulating delivery side. The rotational speed sensor produces signals. An emptying pump has an emptying suction side and an emptying delivery side. The emptying pump is fluidically connected at the emptying suction side to the washing container and to the outflow line at the emptying delivery side. A program control unit has control devices for controlling the circulating pump and the emptying pump. The program control unit is connected to the inlet valve, the circulating pump, and the emptying pump. The program control unit is programmed to selectively open and close the inlet valve and selectively activate and deactivate the emptying pump based on the signals during operation of the circulating pump. The program control unit is programmed to determine a quantity of washing liquid to be pumped away and a quantity of washing liquid to be filled into the washing container based upon a rotational speed of the circulating pump. The circulating pump and the emptying pump are to be operated during a partial exchange of washing liquid.

In accordance with yet a further feature of the invention, the program control unit is programmed to switch off the emptying pump and open the inlet valve during a partial exchange of the washing liquid based on the signals and to close the inlet valve thereafter based on the signals.

In accordance with a concomitant feature of the invention, a filling-level sensor limits the liquid quantity to be pumped away, while the washing liquid quantity that is present in addition to the liquid quantity limited by the filling-level sensor and that is to be pumped away is determined by the rotational speed of the circulating pump. The filling level sensor is connected to the washing container and to the program control unit. The program control unit is programmed to determine, by the rotational speed of the circulating pump, a quantity of washing liquid to be pumped away and a quantity of liquid present in addition to the quantity of liquid limited by the filling-level sensor. By using a filling-level sensor, present in any case, for the minimum filling quantity, the outlay involved in construction and control is reduced even more, resulting in a further advantage in terms of cost.

Other features that are considered as characteristic for the invention are set forth in the appended claims.

Although the invention is illustrated and described herein as embodied in a method for operating a household dishwasher and household dishwasher for carrying out the method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
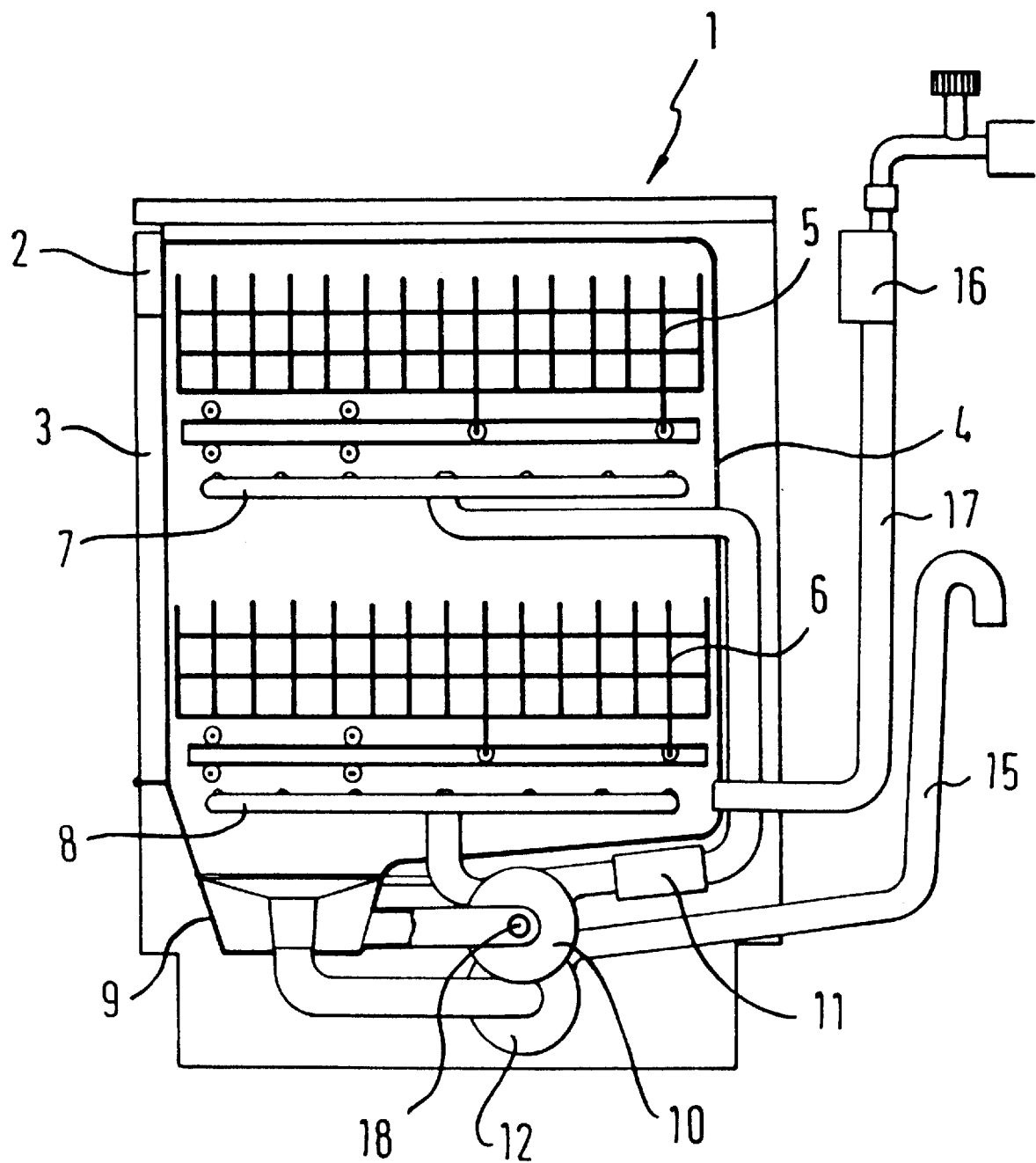
FIG. 1 is a diagrammatic, cross-sectional view of a household dishwasher according to the invention and for carrying out the method according to the invention.

In all the figures of the drawing, sub-features and integral parts that correspond to one another bear the same reference symbol in each case.

Figure 2:
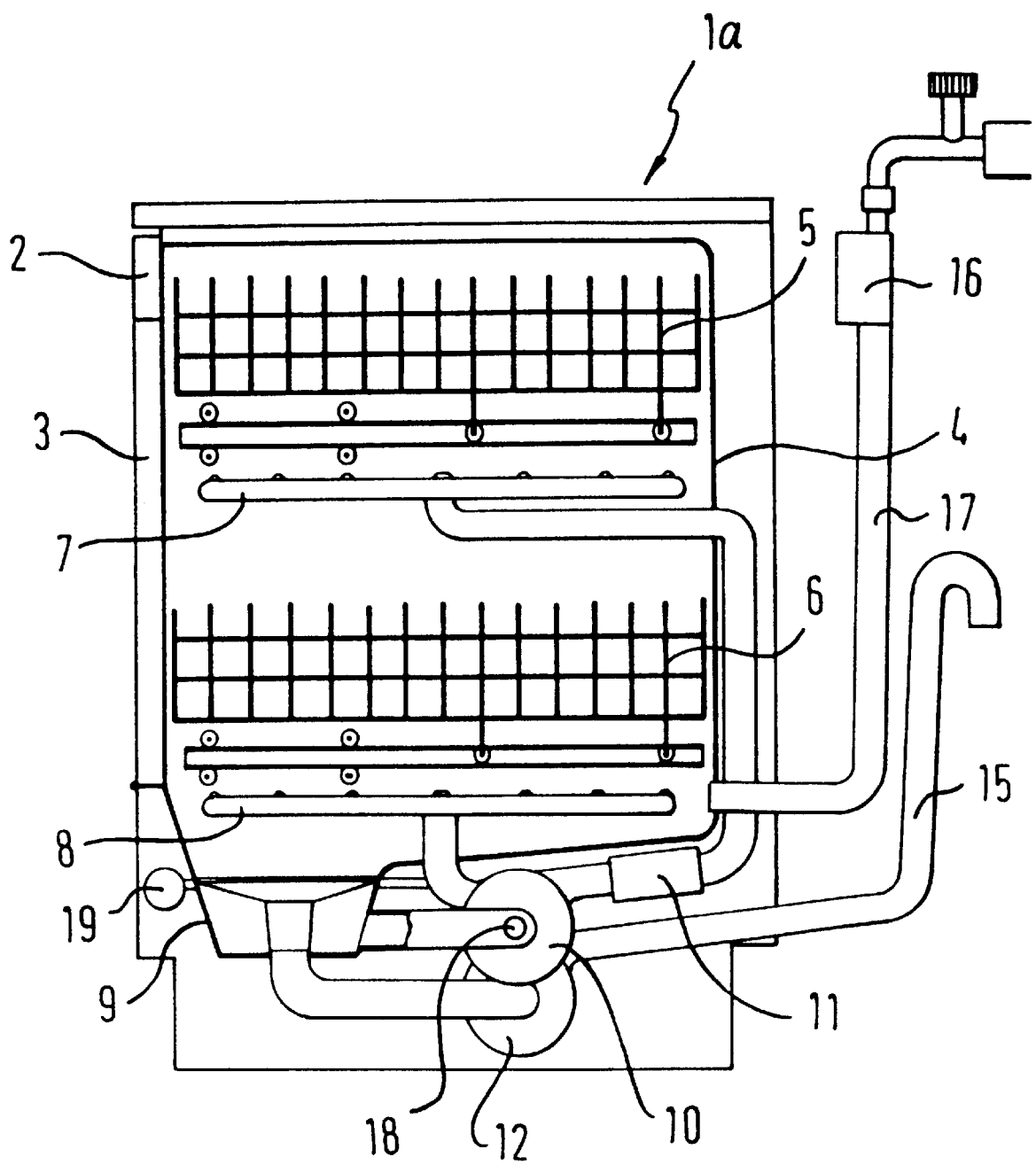
FIG. 2 is a diagrammatic, cross-sectional view of another embodiment of the household dishwasher according to FIG. 1.

Referring now to the figures of the drawings in detail and first, particularly to FIGS. 1 and 2 thereof, there is shown a household dishwasher 1, 1a according to the invention. The operation of the dishwasher 1, 1a is controlled by a program control unit 2, but is not explained in any more detail for clarity. The household dishwasher 1, 1a has a washing container 4 capable of being closed by a front-side door 3 pivotable about a horizontal axis 13. The batch to be cleaned is introduced into utensil baskets 5, 6 that are disposed in the washing container 4. Two utensil baskets 5, 6 are shown in the exemplary embodiments. Each utensil basket 5, 6, together with the batch to be cleaned, is subjected, by an associated spray device 7, 8, to a washing liquid quantity fed on the delivery side by a circulating pump 10 connected on the suction side to a pump bowl 9 disposed in the lowest region of the washing container 4. In various washing program partial steps, the washing liquid quantity can be heated by a suitable heating device, shown in the exemplary embodiments by a flow heater 11. In various washing program partial steps, the washing liquid quantity can be enriched with additives, such as a cleaning agent or rinsing agent, by corresponding non-illustrated adding devices. An emptying pump 12 likewise connected on the suction side to the pump bowl 9 disposed in the lowest region of the washing container 4 serves for emptying. The emptying pump 12 is connected on the delivery side to an outflow line 15. A configuration for controlling the above-mentioned circulating pump 10 and emptying pump 12 is integrated into the program control unit 2. The washing container is filled through a fresh-water feedline 17 provided with an inlet valve 16.

According to the invention, during a partial exchange of the washing liquid, both pumps 10, 12 are operated. At the same time, the washing liquid quantity to be pumped away and thereafter to be introduced again is determined according to the invention by the rotational speed of the circulating pump 10, which has a variable rotational speed, as explained in more detail below. According to the invention, the circulating pump 10 also has a rotational speed sensor 18. To determine the washing liquid quantity to be pumped away and to be filled up again, in the household dishwasher 1, 1a according to the invention, the inlet valve 16 is opened and/or closed and/or the emptying pump 12 is put into operation or switched off while the circulating pump 10 is in operation based on the signals from the rotational speed sensor 18.

In the preferred embodiment shown in FIG. 1, during a partial exchange of the washing liquid, the emptying pump 12, operated in addition to the circulating pump 10 which is in operation, is switched off and the inlet valve 16 is opened based on the signals from the rotational speed sensor 18 and, the inlet valve 16 is closed again based on the signals from the rotational speed sensor 18.

A partial exchange of the washing liquid in a subprogram step of a washing program in the household dishwasher 1 according to the preferred embodiment shown in FIG. 1 is initiated, according to the invention by also switching on the emptying pump 12 in addition to the circulating pump 10 that is normally already in operation. As a result, washing liquid is pumped away from the pump bowl 9. The pumping-away operation takes place until the rotational speed sensor 18 of the circulating pump 10 detects that the circulating pump 10 is rotating, that is to say, is sucking in air, which is manifested as measurable rotational speed fluctuations. The emptying pump 12 is then switched off and the inlet valve 16 is opened. The inlet valve 16 remains open until the rotational speed sensor 18 of the circulating pump 10 detects that the circulating pump 10 is rotating again, that is to say, is no longer drawing in air. The washing liquid quantity that is pumped away and replaced again during the process is determined by the rotational speed of the circulating pump 10. A low rotational speed of the circulating pump 10 causes a high liquid level to prevail, that is to say, a large liquid quantity to accumulate, in the pump bowl 9. A high rotational speed of the circulating pump 10 correspondingly causes a low liquid level to prevail, that is to say, a small liquid quantity to accumulate, in the pump bowl 9. The program control unit 2 controls the rotational speed of the pump in each subprogram step of the washing program so that, even during the partial exchange of the washing liquid, only the appropriate partial quantity is exchanged. Should it be desirable to exchange a partial quantity other than that corresponding to the rotational speed of the circulating pump 10 set in the subprogram step, then the program control unit 2 changes the rotational speed of the circulating pump 10.

In the further advantageous embodiment shown in FIG. 2, the household dishwasher 1a has a filling-level sensor 19. The liquid quantity to be pumped away is limited by the filling-level sensor 19 during a partial exchange of the washing liquid. The washing liquid quantity present in addition to the liquid quantity limited by the filling-level sensor 19 and to be pumped away is determined by the rotational speed of the circulating pump 10. A partial exchange of the washing liquid in a subprogram step of a washing program in the household dishwasher 1a according to the further advantageous embodiment shown in FIG. 2 is initiated as in the embodiment according to FIG. 1 in that the emptying pump 12 is also switched on in addition to the circulating pump 10 that is normally already in operation. As a result, washing liquid is pumped away from the pump bowl 9. The pumping-away operation takes place until the filling-level sensor 19 indicates that the lower filling level at which it is set has been reached. The emptying pump 12 is then switched off and the inlet valve 16 is opened. The inlet valve 16 remains open until the rotational speed sensor 18 of the circulating pump 10 detects that the circulating pump 10 is rotating again, that is to say, it is no longer drawing in air, which is manifested as the setting of a uniform rotational speed. The washing liquid quantity pumped away and replaced again during the process is also determined by the rotational speed of the circulating pump 10 as in the embodiment shown with respect to FIG. 1. A low rotational speed of the circulating pump 10 causes a high liquid level to prevail, that is to say, a large liquid quantity to accumulate, in the pump bowl 9. In other words, a relatively high liquid level is set above the liquid level of the filling-level sensor 19. A high rotational speed of the circulating pump 10 correspondingly causes a low liquid level to prevail, that is to say, a small liquid quantity to accumulate, in the pump bowl 9. In other words, a relatively low liquid level is set above the liquid level of the filling-level sensor 19. The program control unit 2 controls the rotational speed of the pump in each subprogram step of the washing program so that, even during the partial exchange of washing liquid, only the appropriate partial quantity is exchanged. Should it be desirable to exchange a partial quantity other than that corresponding to the rotational speed of the circulating pump 10 set in the subprogram step, then, as in the method according to FIG. 1, the program control unit 2 changes the rotational speed of the circulating pump 10.

As shown in both embodiments, in a method for operating a household dishwasher 1, 1a and in a household dishwasher 1, 1a for carrying out the method, the invention affords a possibility of carrying out a partial exchange of the washing liquid without unnecessary water and energy consumption in a simple way.

We claim:

1. A method for operating a household dishwasher, which comprises:
    filling a washing container through a fresh-water feedline having an inlet valve;
    connecting a variable-speed circulating pump to the washing container on a suction side of the circulating pump and to at least one spray device on a delivery side of the circulating pump;
    connecting an emptying pump to the washing container on the suction side of the emptying pump and to an outflow line on a delivery side of the emptying pump;
    providing a program control unit having control devices for controlling the circulating and emptying pumps;
    operating both of the circulating and emptying pumps during a partial exchange of the washing liquid; and
    determining a washing liquid quantity to be pumped away and thereafter to be introduced again by a rotational speed of the circulating pump.

2. The method according to claim 1, which further comprises:
    switching off the emptying pump during a partial exchange of the washing liquid while the circulating pump is operating based on signals from a rotational speed sensor; and
    at least one of opening and closing the inlet valve based on the signals from the rotational speed sensor.

3. The method according to claim 2, which further comprises connecting the rotational speed sensor to the circulating pump.

4. The method according to claim 1, which further comprises:
    switching off the emptying pump during a partial exchange of the washing liquid while the circulating pump is operating based on signals from a rotational speed sensor; and
    opening the inlet valve based on the signals from the rotational speed sensor and then closing the inlet valve based on the signals from the rotational speed sensor.

5. The method according to claim 4, which further comprises connecting the rotational speed sensor to the circulating pump.

6. The method according to claim 1, which further comprises switching off the emptying pump during a partial exchange of the washing liquid while the circulating pump is operating based on signals from a rotational speed sensor.

7. The method according to claim 1, which further comprises at least one of opening and closing the inlet valve based on signals from a rotational speed sensor.

8. The method according to claim 1, which further comprises limiting the liquid quantity to be pumped away with a filling-level sensor, and determining, by the rotational speed of the circulating pump, the washing liquid quantity present in addition to the liquid quantity limited by the filling-level sensor and to be pumped away.

9. The method according to claim 1, which further comprises limiting the liquid quantity to be pumped away with a filling-level sensor during a partial exchange of the washing liquid.

10. A household dishwasher, comprising:
    at least one spray device;
    an outflow line;
    a fresh-water feedline having an inlet valve;
    a washing container for holding washing fluid, said washing container fluidically connected to said fresh-water feedline for filling said washing container;
    a variable speed circulating pump having a rotational speed sensor, a circulating suction side, and a circulating delivery side, said circulating pump fluidically connected to said washing container at said circulating suction side and fluidically connected to said at least one spray device at said circulating delivery side, said rotational speed sensor producing signals;
    an emptying pump having a emptying suction side and a emptying delivery side, said emptying pump fluidically connected at said emptying suction side to said washing container and to said outflow line at said emptying delivery side;
    a program control unit having control devices for controlling said circulating pump and said emptying pump, said program control unit connected to said inlet valve, said circulating pump, and said emptying pump;
    said program control unit programmed to at least one of selectively open and close said inlet valve and selectively activate and deactivate said emptying pump based on said signals during operation of said circulating pump;
    said program control unit programmed to determine at least one of a quantity of washing liquid to be pumped away and a quantity of washing liquid to be filled into said washing container based upon a rotational speed of said circulating pump; and
    said circulating pump and said emptying pump to be operated during a partial exchange of washing liquid.

11. The household dishwasher according to claim 10, wherein said program control unit is programmed to switch off said emptying pump and open said inlet valve during a partial exchange of the washing liquid based on said signals and to close said inlet valve thereafter based on said signals.

12. The household dishwasher according to claim 10, including a filling level sensor for limiting a quantity of liquid to be pumped away, said filling level sensor being connected to said washing container and to said program control unit, said program control unit being programmed to determine, by the rotational speed of said circulating pump, a quantity of washing liquid to be pumped away and a quantity of liquid present in addition to said quantity of liquid limited by said filling-level sensor.

* * * * *